United States Patent Office 3,100,258
Patented Aug. 6, 1963

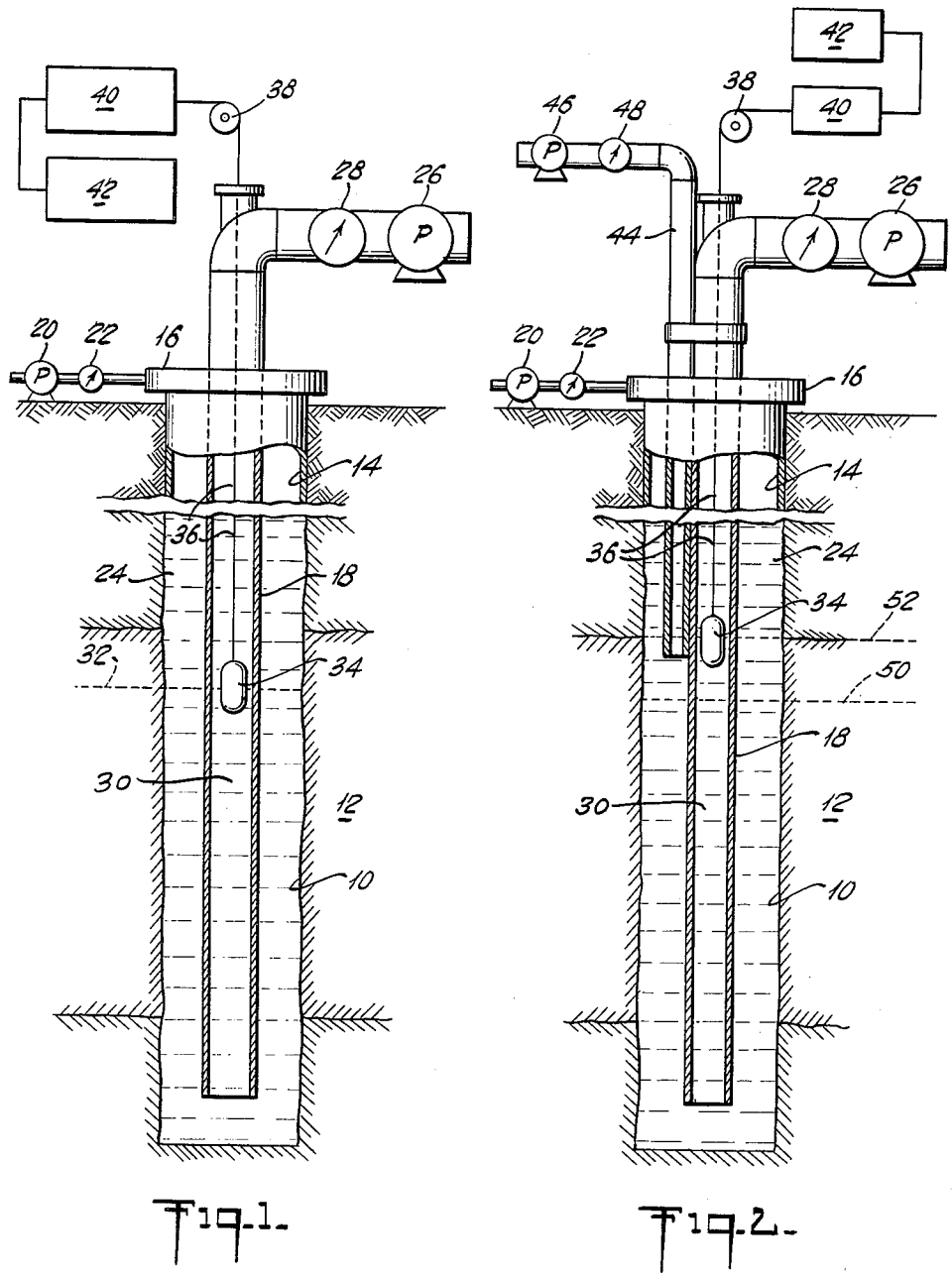

3,100,258
SUBSURFACE EXPLORATION
Karl C. ten Brink, Houston, and Richard H. Widmyer, Bellaire, Tex., assignors to Texaco Inc., a corporation of Delaware
Filed July 21, 1958, Ser. No. 749,928
2 Claims. (Cl. 250—43.5)

This invention relates to a method of studying subsurface earth formations and more particularly to a method of measuring the permeability of earth formations traversed by a well or borehole. The term "permeability" is used herein in the broad sense as meaning the relative receptability of the permeable formations to the ingress of fluid as influenced by the applied pressure of the fluid and the varying back pressures in various strata, and is not used in the technical sense of the measured permeability of the removed rock in millidarcies as defined by Darcy's law. By determining this relative permeability or receptability at various vertically spaced points in the well, a log is obtained which is known in this art as an injectivity profile of the well.

An object of this invention is the provision of an improved method wherein accurate measurements can be made without the use of complicated equipment for determining the permeability of an oil producing formation.

Another object of this invention is an improved method of determining the amount of oil passing through various increments of an exposed, more or less permeable subsurface formation wall.

A method of obtaining an injectivity profile of a well is described in U.S. Patent 2,700,734, granted to Egan and Herzog on January 25, 1955. In accordace with the disclosure in that patent, two streams of fluid are pumped into a well, one stream through a string of tubing extending downwardly below the formation of interest and the other stream downwardly through the annular space between the tubing and the casing or the walls of the borehole. The streams are pumped simultaneously and each stream is carefully metered at the surface. The fluid pumped down through the tubing will fill the lower part of the borehole and then flow upwardly around the tubing until it meets the fluid pumped downwardly around the tubing in the annulus, forming an interface between the two streams or bodies of fluid. Into one of the two streams is incorporated a small amount of tracer material such as a radioactive substance. In order to locate the interface between the radioactive and the nonradioactive bodies of fluid a suitable radiation detector is passed through the tubing, its depth being recorded continuously. From the record of the output of the detector the depth of the interface can be readily ascertained since the response of the detector will change more or less suddenly when the detector passes from the radioactive fluid into the nonradioactive fluid, or vice versa.

The rates of injection of pumping of the two streams can be varied by means of the pumps or valves located at the surface, the rates being adjusted so that at all times the sum of the rates remains constant. The ratio of the amount of the radioactive fluid pumped to the amount of nonradioactive fluid pumped is varied such that the interface will be forced to move through the well, past the exposed walls of the formation or zone to be examined, to a new position. The rates of injection of the two streams are varied in increments and the position of the interface will therefore change by steps, the vertical length of these steps depending upon the permeability of the formation. After each adjustment or change in rates of injection, the radiation detector is passed through the well and a record made of the depth of the interface after such adjustment. In this manner an injectivity profile is made of the formation to be examined and this record will show clearly variations in the permeability of all sections or formations of interest.

Heretofore, as described in the above identified patent, radioactive sodium iodide has been used as the tracer material in one of the two fluid streams introduced into the borehole. When the fluid stream introduced into the subsurface formations is a hydrocarbon oil, the sodium iodide partitions itself between the oil and the interstitial water in the subsurface formations. It has been found that the area in the vicinity of the borehole cannot be freed readily from these radioactive materials and their associated radiation emanations, even by flushing a nonradioactive fluid through the contaminated formations, until sufficient decay of the radioactive material has occurred so that radiation from the same is insignificant. Thus, these radiations produce a high radioactive background in the borehole which interfere with radiation tests made soon after the original survey, which tests may include repeat permeability logs or standard radioactive logs, for example, for determining the porosity of subsurface formations.

Accordingly, this invention provides an improved method for obtaining permeability logs by incorporating into a hydrocarbon oil stream which is to be introduced into a predetermined zone of a borehole a radioactive metallo organic compound soluble in the hydrocarbon oil, and substantially insoluble in water, and non-polar and which does not seek an oil-water interface.

For a better understanding of the invention, reference may be had to the accompanying drawing in which:

FIG. 1 is a vertical sectional elevation through a well showing apparatus used to make an oil injection profile employing two streams forming a single fluid interface; and FIG. 2 is a vertical sectional elevation through a well showing the apparatus used to make an oil injection profile employing three streams forming two interfaces.

Referring to FIG. 1 of the drawing, a well or borehole 10 is shown as traversing several subsurface formations including a permeable oil producing formation 12 for which it is desired to make an oil injection profile. The upper portion of the well is shown as being provided with a casing 14 having a closed casing head 16. A string of tubing 18 passes through the casing head and downwardly through the well to a point below the formation 12. At the surface a pump 20 is connected to the casing head through a meter 22 and is adapted to pump a stream of oil 24 downwardly into the well through the annular space between the casing 14 and the tubing 18. In order to locate in the well the interface between these two streams one of these two streams is tagged. To tag the stream flowing down the annulus, a small amount of oil soluble radioactive metallo organic compound, which is substantially insoluble in water and non-polar and which does not seek an oil-water interface, preferably, an antimony 124 compound such as tri phenyl stibene $Sb(C_6H_5)_3$, is added to the oil 24 by means, not shown, preferably after the oil has discharged from the pump 20.

The antimony 124 compound may be transported to the well site in a one-ounce screw cap plastic or glass bottle containing the radioactive antimony 124 in benzol. The compound may be shipped in such a concentration as to have the desired radioactivity on the date a survey is to be made. The tracer solution to be injected into the oil stream is prepared in a preferably lid covered mixing tank by adding the contents of the bottle to a predetermined amount of oil-miscible solvent, such as kerosene or benzene to produce the desired amount of injection solution of desired strength. Kerosene is a satisfactory diluent because it is readily available in the field.

The tracer mixing tank may be connected to a positive displacement pump having an output which is variable from zero to 1.2 gallons per hour and having a calibrated vernier mechanism for controlling the length of the stroke. In addition to the calibrated setting of the pump the injection fluid may be piped through visual flow indicators and then introduced into the desired stream.

Pump 26 is shown connected through meter 28 to the upper end of the tubing 18 and is adapted to pump nonradioactive oil 30 downwardly through the tubing 18. The nonradioactive oil 30 passes out the bottom end of the tubing 18 and upwardly around the tubing 18 until it meets the radioactive oil 24 at the interface 32. It will be seen that if the pumps 20 and 26 are adjusted to change their rates of pumping while the total amount of oil pumped by both pumps remains constant the interface 32 will generally be caused to move up or down in the hole depending upon the two pumping rates.

It should be understood that instead of using one pump to pump the tubing stream and another pump to pump the annulus stream the apparatus may include a single pump to pump the total stream and a two-way valve to divide the total stream into the tubing and annulus streams in the desired proportions to thus facilitate maintaining a constant total flow rate.

Shown as suspended within the tubing 18 is a radioactivity logging instrument 34 containing a detector of gamma rays, the output of which is conducted upwardly through the cable 36. This cable passes over a suitable cable measuring device 38 which continuously indicates the depth of instrument 34 in the hole and then to a suitable amplifier 40 and a recorder 42. When the instrument 34 is lowered down through the tubing it will of course respond to the radiation of the radioactive oil until it passes the interface 32 when the detector output will suddenly decrease. A record of the output of the detector 34 is made continuously by the recorder 42 and this is correlated with the depth of the detector 34 in the hole as measured by the cable measuring device 38. Thus by passing the detector 34 through the hole 10 and comparing points in the record at which the detector 34 passes from the radioactive fluid with the depth in the hole at which these points are registered, an accurate measurement is made of the depth of the interface 32.

After the interface has been located in the borehole for a given ratio of flow rates of the two oil streams, the ratio of the flow rates of the radioactive fluid 24 and the nonradioactive fluid 30 are changed. The interface 32 between the fluids will move along the formation to a new location to an extent depending upon the permeability of the formation to be located in the manner explained hereinabove. Although the ratio of the flow rates of the two streams is changed the sum of the flow rates of the two streams is held constant.

Although in the above described method the radioactive oil has been pumped down through the annular space between the tubing 18 and the walls of the hole 10 and the nonradioactive oil 30 through the tubing, it is to be understood that the paths of these oils can be interchanged, that is, the radioactive oil can be pumped down through the tubing 18 and the nonradioactive oil can be pumped down through the annulus without affecting the process.

As mentioned hereinabove, in accordance with this invention, a radioactive metallo organic compound which is soluble in hydrocarbon oil, substantially insoluble in water and non-polar, and which does not seek an oil-water interface is used as the tracer material in the hydrocarbon oil stream. One of the most desirable features of such a radioactive compound is the fact that it can be easily flushed from the wall of the borehole by nonradioactive oil so that a subsequent survey, for example, a run for a repeat permeability log or for a conventional radiation log to determine the porosity of the subsurface formations, may be made without encountering a high radiation background and without waiting for the decay of radioactivity of the radioactive material used. A metallo organic compound including radioactive antimony 124 which has a half-life of 60 days has been found to be especially desirable because antimony 124 compounds are very soluble in oil and substantially insoluble in water. Consequently, this radioactive material can be readily removed from the area of the borehole since the interstitial waters, which cannot be readily flushed out of the formation, will not absorb the radioactive compound and the radioactive oil can be readily removed from the vicinity of the borehole merely by flushing the contaminated subsurface formation with nonradioactive oil. Although oil soluble but water insoluble radioactive antimony 124 compounds, such as tri phenyl stibene, are preferred other such compounds may be used. Suitable oil soluble, substantially water insoluble and non-polar compounds which do not seek an oil-water interface include alkyl, aryl, alkaryl, and aralkyl compounds of antimony, arsenic, bismuth, lead, and mercury having a gamma emitting isotope.

Suitable examples of available compounds of arsenic are di methyl arsine (tetra methyl diarsine), di ethyl arsine (tetra ethyl diarsine), tri ethyl arsine, tri methyl arsine, and tri phenyl arsine, wherein the compound contains a gamma emitting isotope of arsenic selected from

| Arsenic: | Half life |
|---|---|
| 71 | hours__ 62 |
| 72 | do____ 26 |
| 73 | days__ 76 |
| 74 | do____ 17 |
| 76 | hours__ 27 |
| 77 | do____ 39 |

Suitable examples of available compounds of bismuth are tri methyl bismuthine, tri ethyl bismuthine, and tri phenyl bismuthine, wherein the compound contains a gamma emitting isotope of bismuth selected from

| Bismuth: | Half life |
|---|---|
| 203 | hours__ 12 |
| 204 | do____ 12 |
| 205 | days__ 14 |
| 206 | do____ 6.4 |
| 207 | years__ 8 |

Suitable examples of available compounds of lead are tetra methyl lead, tetra ethyl lead, tetra phenyl lead, tetra propyl lead, and tri ethyl lead, wherein the compound contains a gamma emitting isotope of lead selected from

| Lead: | Half life |
|---|---|
| 200 | hours__ 21 |
| 210(RaD) | years__ 20 |
| 212(ThB) | hours__ 10.6 |

Suitable examples of available compounds of antimony are tri phenyl stibene and tri ethyl antimony, wherein the compound contains a gamma emitting isotope of antimony selected from

| Antimony: | Half life |
|---|---|
| 119 | hours__ 38 |
| 120 | days__ 5.8 |
| 122 | do____ 2.8 |
| 124 | do____ 60 |
| 125 | years__ 2.7 |
| 127 | hours__ 93 |

Suitable examples of available compounds of mercury are di benzyl mercury, di amyl mercury, di butyl mercury, di ethyl mercury, di hexyl mercury, di propyl mercury, di methyl mercury, di phenyl mercury, and di tolyl mercury, wherein the compound contains a gamma emitting isotope of mercury selected from

| Mercury: | Half life |
|---|---|
| 195 | hours__ 40 |
| 197 | do____ 25 |
| 203 | days__ 48 |

The logging method described hereinabove somewhat in detail relates to a single fluid interface method of determining the injectivity profile of a subsurface formation traversed by a borehole. It should be understood that the method of the invention is not limited to the single-interface method of determining subsurface formation permeabilities. Another method contemplated within the scope of this invention is the two interface method, the apparatus of which is illustrated in FIG. 2. This apparatus is similar to the apparatus illustrated in FIG. 1 except that it further includes an adjustable thin or macaroni tubing 44 which is lowered into the borehole so that the lower opening thereof is approximately opposite the formation interval being measured. Connected to the upper end of the macaroni tubing 44 is a third pump 46 and a third meter 48. The addition of the macaroni tubing 44 provides means for introducing a third stream into the borehole 10 to form therein between three fluid bodies two interfaces 50 and 52. In this two interface system which is described in more detail in copending applications having Serial No. 463,998 filed October 22, 1954 and having Serial No. 704,814, filed December 23, 1957, the rate of flow of the stream through the macaroni tubing 44 is maintained constant and the total rates of flow of the three streams is also held constant. The stream through the tubing and the stream down the annulus are varied as before and the lower open end of the macaroni tubing is adjusted for each run so as to be disposed opposite the increment of the formation under test. The radioactivity logger is employed in the same manner as in the single interface method except that the detector will indicate two interfaces. The location of the two interfaces is readily detected by injecting the oil soluble, water insoluble radioactive tracer into the stream flowing through the macaroni tubing. However, as an alternative, this radioactive tracer may be injected into both the oil stream flowing through the tubing and the oil stream flowing downwardly through the annulus. An advantage of this two interface method is that a single run of the detector indicating the two fluid interfaces determines directly the permeability of or the rate of fluid flow into the increment of the formation between these two interfaces.

A further method of determining the permeability of a subsurface formation contemplated within the scope of this invention includes merely injecting the oil stream containing the oil soluble, water insoluble radioactive metallo organic compound into a desired permeable subsurface formation, then flushing the formation containing the radioactive oil with nonradioactive oil and detecting the rate of decrease of the radioactive intensity.

An important use of the method of this invention is in remedial work in a producing well. When a formation of a producing well is to be fractured to increase the permeability thereof the location and extent of the increase can be readily determined by obtaining a first injectivity profile log before the formation is fractured and then obtaining a second injectivity profile log after the formation has been fractured. The points of fracture may be determined by comparing the two logs.

Obviously, many modifications and variations of the invention as hereinabove set forth may be made without departing from the spirit and scope thereof and therefore only such limitations should be made as are indicated in the appended claims.

We claim:

1. In a process of obtaining a permeability log of a subsurface formation traversed by a borehole, wherein a first hydrocarbon oil is introduced into the borehole above said formation, a second hydrocarbon oil is simultaneously introduced into said borehole at a point below said formation to establish an interface between said first and second hydrocarbon oils in said borehole in the vicinity of said formation, one of said oils containing a small amount of a radioactive substance, the depth in the borehole of said interface is determined by measuring the radioactivity in the borehole in the vicinity of said formation, the amounts of the two oils are varied so as to move the interface to a new location while the sum of the two oils is maintained constant, the depth of the interface is again determined by measuring the radioactivity in the vicinity of the formation, and these operations are repeated while noting the ratios of the two oils being introduced for each measured depth of the interface in the borehole, the method which comprises incorporating as the radioactive substance in said one of said hydrocarbon oils a radioactive organic compound which is soluble in said hydrocarbon oil, substantially insoluble in water, and non-polar, and which does not seek an oil-water interface, and flushing said formation with a hydrocarbon oil free from said radioactive substance, followed by making another radiation log in said borehole within less than the half life of the said radioactive organic compound employed.

2. In a process according to claim 1, the method which comprises incorporating as the radioactive substance in said one of said hydrocarbon oils a radioactive organic compound which is soluble in said hydrocarbon oil, substantially insoluble in water, and non-polar, and which does not seek an oil-water interface, and flushing said formation with a hydrocarbon oil free from said radioactive substance, followed by making another permeability log employing hydrocarbon oils with a radioactive tracer in one of them, said last named permeability log being made within less than the half life time of the said radioactive organic compound employed.

References Cited in the file of this patent

UNITED STATES PATENTS

| | | |
|---|---|---|
| 2,352,993 | Albertson | July 4, 1944 |
| 2,700,734 | Egan et al. | Jan. 25, 1955 |
| 2,747,099 | Nowak | May 22, 1956 |

OTHER REFERENCES

Using Tracers in Refinery Control, by D. E. Hull, from Nucleonics, vol. 13, No. 4, April 1955, pages 18 to 21.